UNITED STATES PATENT OFFICE.

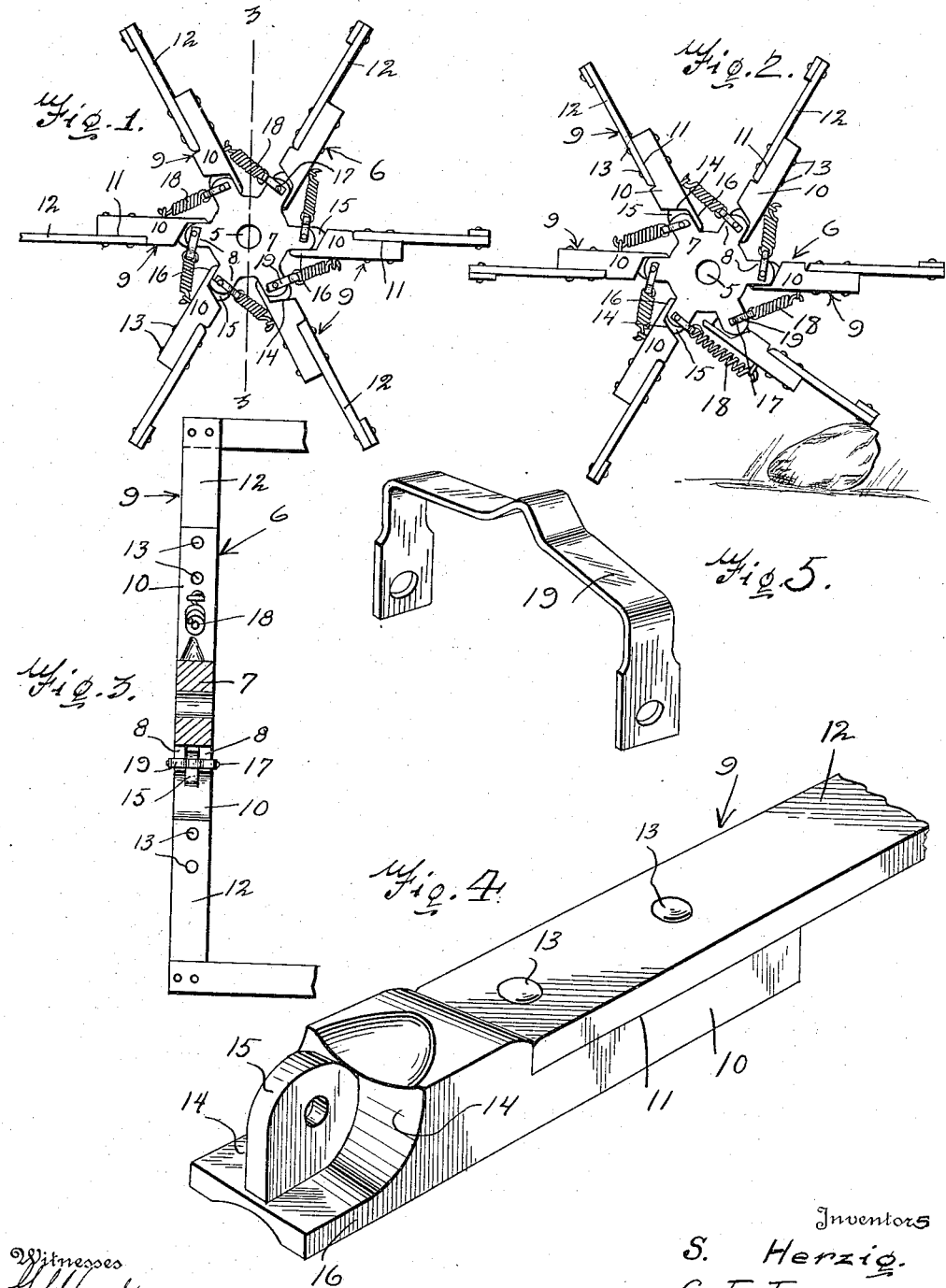
S. HERZIG & C. E. EVERSON.
YIELDABLE REEL FOR HARVESTERS.
APPLICATION FILED AUG. 25, 1914.
1,147,862. Patented July 27, 1915.

STANIS HERZIG AND CHARLES E. EVERSON, OF BILLINGS, NORTH DAKOTA.

YIELDABLE REEL FOR HARVESTERS.

1,147,862.  Specification of Letters Patent.  Patented July 27, 1915.

Application filed August 25, 1914. Serial No. 858,533.

*To all whom it may concern:*

Be it known that we, STANIS HERZIG and CHARLES E. EVERSON, citizens of Billings, in the county of Billings and State of North Dakota, have invented certain new and useful Improvements in Yieldable Reels for Harvesters; and we do hereby declare the following to be a full, clear, and exact description of the invention, such as will enable others skilled in the art to which it appertains to make and use the same.

This invention relates to harvesting machines, particularly to the reel therefor, and has for its object the provision of a harvester reel so constructed that the radial arms may yield when sudden strain has been put upon them as when an obstruction is struck, whereby the arms will be prevented from breaking.

An important object is the provision of a device of this character which will be durable and substantial in service, simple and inexpensive in construction, and a general improvement of the art.

With these and other objects and advantages in view, the invention consists in the novel construction and arrangement of parts to be hereinafter more fully described and claimed, and illustrated in the accompanying drawing, in which—

Figure 1 is an end elevation of the novel reel in its normal position, Fig. 2 is a similar view showing one of the radial arms moved upon striking an obstruction, Fig. 3 is a longitudinal sectional view through the reel, Fig. 4 is a perspective view of one of the arms detached, and Fig. 5 is a perspective view of one of the spring holding yokes.

Referring more particularly to the drawing the numeral 5 designates the shaft upon which the novel reel 6 is secured. The reel comprises hubs 7 each having a plurality of spaced ears 8 formed thereon in pairs.

The arms 9 of the reel comprise body portions 10 recessed adjacent their outer edges as shown at 11 for the reception of blades 12 which are secured to the body portions 10 by bolts or screws 13. The ends of the blades 12 on one hub are connected with the corresponding ends of the blades on the other hub. Each of the body portions 10 of the arms 9 is cut away at its inner end as shown at 14 to provide an ear 15 extending from a solid back portion 16. The arms are secured in place by passing bolts 17 through alined openings in the ears 8 and 15. When the arms are thus secured in place it will be observed that they may swing freely in one direction but are prevented from movement in the opposite direction by the engagement of the back portion 16 with the edges of the ears 8.

In order to provide resilient means for opposing the movement of the arms 9 in the direction of their yieldability, we provide coil springs 18 connected with the body portions 10 and connected at their other ends with substantially U-shaped yokes 19 which have their arms straddling the ears 8 and apertured for the reception of the bolts and apertured for the reception of the bolts 17.

From the foregoing description and a study of the drawing, it will be apparent that when the reel is in use, the springs 18 will hold the arms against movement so that they will perform their usual function. If however, an obstruction is struck, the arms will give and consequently prevent the breaking of the reel.

It will be readily understood that we reserve the right to make various changes in the form, construction and arrangement of parts without departing from the spirit of the invention or limiting the scope of the subjoined claim.

Having thus described our invention, we claim:—

A reel for harvesters comprising the combination with a shaft of a pair of hubs thereon, a plurality of pairs of spaced gears on each of said hubs, and an arm associated with each pair of ears, said arm comprising a body portion recessed at its inner end to provide a solid back portion and an ear, the ear being disposed between a pair of said first named ears, a U-shaped yoke straddling each pair of ears, a bolt passing through the arms of said yoke, said pair of ears and said single ear, and a spring connected with each of said yokes and with the back of the next adjacent arm.

In testimony whereof, we affix our signatures in the presence of two witnesses.

STANIS HERZIG.
CHARLES E. EVERSON.

Witnesses:
RICHARD MILES,
SCOTT GORE.

Copies of this patent may be obtained for five cents each, by addressing the "Commissioner of Patents, Washington, D. C."